Dec. 25, 1962     C. A. SCHAD     3,070,303
MOVABLE LIGHT PATH INTEGRATOR

Filed Jan. 21, 1959     4 Sheets-Sheet 1

CHARLES A. SCHAD
INVENTOR.

BY *James R. Head*

ATTORNEY

Dec. 25, 1962 C. A. SCHAD 3,070,303
MOVABLE LIGHT PATH INTEGRATOR
Filed Jan. 21, 1959 4 Sheets-Sheet 2

CHARLES A. SCHAD
INVENTOR.

BY *James R. Head*

ATTORNEY

Dec. 25, 1962    C. A. SCHAD    3,070,303
MOVABLE LIGHT PATH INTEGRATOR
Filed Jan. 21, 1959    4 Sheets-Sheet 3

CHARLES A. SCHAD
INVENTOR.

BY James R. Head

ATTORNEY

Dec. 25, 1962     C. A. SCHAD     3,070,303
MOVABLE LIGHT PATH INTEGRATOR
Filed Jan. 21, 1959     4 Sheets-Sheet 4

CHARLES A. SCHAD
INVENTOR.

BY *James R. Head*

ATTORNEY

United States Patent Office 3,070,303
Patented Dec. 25, 1962

3,070,303
MOVABLE LIGHT PATH INTEGRATOR
Charles Albert Schad, Tulsa, Okla., assignor, by mesne assignments, to Black, Sivalls & Bryson, Inc., Kansas City, Mo., a corporation of Delaware
Filed Jan. 21, 1959, Ser. No. 788,183
5 Claims. (Cl. 235—154)

This invention relates to apparatus for use in integration of quantitative values. More particularly, it concerns photo-electric and mechanical apparatus for indicating and obtaining instantaneous values of measurable physical functions. This invention further relates to apparatus which will integrate these physical functions and provide digital read-out from which the average value of one variable with respect to another may be readily determined.

In many industrial applications it is of value to know the instantaneous magnitude of varying physical quality or quantity with respect to some other physical quality or quantity. Typically this might be a time varying electric signal, such as voltage or current in a circuit, or a mechanical displacement caused by pressure or temperature. It is also of importance to integrate the various values of a physical function in relation to another function, usually time. It is of further importance to provide some form of read-out for the total value of a physical function over an interval of time (integral) and to provide an average value of a variable function over a time interval.

Heretofore, mechanical integrators and computers which utilize cams, gears, rollers and discs have been used for the solution of mathematical problems. However, these devices introduce friction and wear variations, leading to inaccuracies which increase with the time interval of integration.

Accordingly, it is a basic purpose of this invention to provide an integrator and computer in which the resolution accuracy increases with time.

In many applications where a variable function is measured with respect to time, a strip or circular-chart recording device is used. In many instances it is desirable to have an integrated or averaged relation between the physical values rather than merely a simple recorded variation. Typically, a chart reader or integration device has been used heretofore to perform this step, usually after the chart has been moved from the recorder. It is an involved procedure, usually performed at some place away from the source of information gathering. This method is both tedious and inadequate in those instances where it is desirable to know, at any instant, the average and the integrated values before the chart record is moved from the recorder.

Accordingly, it is an object of this invention to provide an integrator and read-out device which will overcome the limitations heretofore known in prior-art apparatus and procedure.

It is another object of this invention to provide apparatus which will give instantaneous values between two or more linear functions, non-linear functions, or linear and non-linear functions.

It is another object of this invention to provide apparatus which may be placed in series by appropriate electrical circuits to provide multiple integral information.

Another object of this invention is to provide apparatus which will integrate multiple functions in a single unit.

It is still another object of this invention to provide apparatus which will convert analog linear or non-linear physical functions into various forms of mechanical movement to provide immediate digital read-out information.

A still further object is to provide a device or devices which will indicate, integrate, and average physical functions with complete isolation between physical and electrical systems.

Broadly, the apparatus of this invention comprises two rotatable scanning light conductors. A light source is at one end, and light sensitive pickups at the other end of each conductor. Within the first rotary path are a multiplicity of light admitters or interrupters. These are scanned by the path and the resulting light pulses are counted by the pickups and their associated circuitry. A first linear or non-linear function is mechanically applied to rotate the conductors. A second linear or non-linear function actuates an angular displacement transducer to interrupt the second rotating light conductor to initiate the above-mentioned counting operation. Mechanical and/or electronic apparatus are used to re-set the apparatus for the beginning of each new cycle.

Specifically, the light conductors are caused to rotate at a rate proportional to one input variable. The other input variable produces an angular displacement of the pointer of the displacement transducer. The second light conductor is interrupted on passing the pointer to initiate the counting operation by the first conductor. Only those pulses occurring after the initiation of the counting operation are recorded. Therefore, the number of pulses recorded is a function of the angular position of the pointer of the angular displacement transducer. Upon completion of the scan, the second light conductor is again interrupted to deactivate the count recording system. Therefore, no further count recording will occur until the second light conductor is again interrupted to initiate the count.

The objects and broad statement of the invention will become more readily apparent upon reading of the specification and claims when taken in conjunction with the following illustrations, in which:

Description

Figure 1:
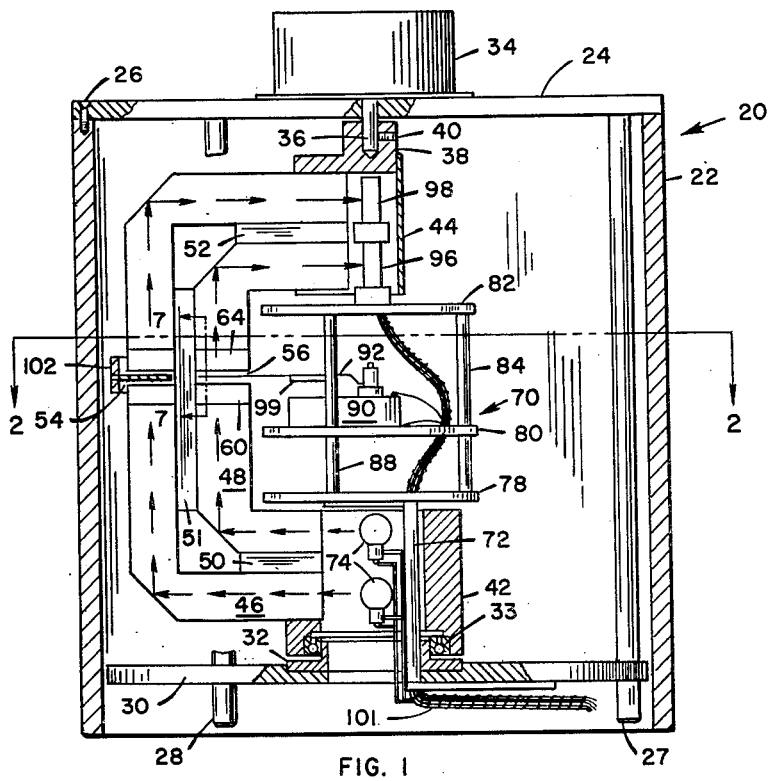
FIG. 1 is a sectional elevation of the housing and integrating apparatus of this invention according to one embodiment.

FIG. 1 represents one form of photo-electric-mechanical apparatus according to this invention. The apparatus generally indicated at 20, includes a number of supporting members such as cylindrical housing member 22 and the elements which are normally inserted within the support housing. These include a disc-shaped or circular top portion 24, which is attached to housing 22 by fasteners 26, around the periphery, and the longitudinal supports 27, 28, and 29. As described in FIG. 2, these are appropriately spaced about the periphery of the apparatus. Attached to the lower end of the longitudinal rods is circular base plate 30. Centrally located on plate 30 is bearing support member 32 and associated bearing 33. In some instances the lower bearing assembly is omitted where rotational speeds and forces are low.

Figure 7:
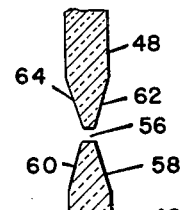
FIG. 7 is a sectional view taken along the line 7—7 of FIG. 1.

A mechanical transducer 34 is centrally mounted on top 24. Rotating shaft 36 of the transducer passes through top 24 and is affixed to member 38 by set screw 40. The rotating portion of the apparatus includes lower sleeve member 42 and upper sleeve member 44. This latter sleeve is attached to the upper member 38. Attached to these rotatable members are light transmitting conductors or paths 46 and 48. Path 46 is the principal, digital scanning beam of light, while 48 might be termed an activating and deactivating beam. These light conductor paths are shown as typically constructed and are interconnected and held by opaque separators, 50, 51, and 52. The light conductive path or paths are constructed of a light transparent material including glass or synthetic resins, such as, methyl methacrylate resin. In one embodiment a single light conductive path may be used with two or more light sensitive pickups to divide and form the separate paths or by appropriately positioned reflectors. Light path 46 is in two portions separated by slot 54. The slot has beveled face portions to concentrate the light to a relatively narrow beam. Similarly, light path 48 is in two parts separated by slot 56, more aptly shown in cross-section in FIG. 7, with beveled edges 58, 60, 62, and 64 on the respective parts of slot 56.

The rotating assembly just described is rotated within the housing 22, about a stationary assembly, generally shown at 70. This assembly includes a lower support rod 72, to which light source assembly 74 is connected. This latter assembly may be a single light source or bulb or a double source, as shown. The rod 72 is attached to lower base support 30. Attached to the support rod 72, at its upper end, are one or more tiers such as platforms 78, 80, and 82. These are interconnected and vertically spaced by support rods 84, 86, and 88. Positioned on plate 80 is an angular displacement transducer 90, such as a meter. This meter includes indicating arm 92, extending into slot 56 of light path 48. A light-blanking element 94 is attached to the arm 92, so as to provide a positive interruption of light conducting through path 48. Upper platform 82 has affixed thereon, light sensitive pickup cells 96 and 98. These are vertically spaced respectively opposite the ends of rotative light paths 48 and 46.

A circuit deactivating blanking member 99 is shown rigidly attached to assembly 70 at support rod 86. The member extends into the slot 56 as path 48 is rotated and interrupts the light beam to deactivate the count recording circuit upon completion of the scan.

Bundled electrical conduits 101 for interconnection of the electrical circuit to the light source assembly 74 and photoelectric pickup devices 96 and 98, pass through lower tubular support 72 and upward, connecting with the appropriate electrical element. In the instance where angular displacement transducer 90 is other than an electrical measuring instrument, e.g., the transducer is a Bourdon-Tube pressure measuring device, fluid connections will pass upwardly through either tubular support member 72, or within that space around which the light paths and attached elements rotate.

A fixed digit blanking assembly is attached to the supporting apparatus such as longitudinal support rods 28 and 29, and generally comprises an outer cylindrical arc 102. Attached to this cylinder are radial digit blanking pins 104, more aptly described and shown in FIGURE 2. These digit blanking pins are spaced on the cylinder throughout the movement limits of arm 92 of angular displacement transducer 90. The number of pins 104 is a function of the accuracy desired in measurement of the input to the angular displacement transducer. The assembly and pins are spaced at an elevation within the rotative path of slot 54 to interrupt the light beam along path 46, the operation of which will be hereinafter more adequately described.

The angular movement and hence number of digit blanking pins may be increased or decreased from those shown, depending upon the application to which the integrator is placed. For example, the relative spacing between the light admitters or interrupters may be linear or non-linear. Examples of the latter are logarithmic or empirical spacing.

The apparatus illustrated in FIGS. 3, 4, 5 and 6, include, as a part of this invention, certain changes and modifications which are to be considered as a part of this invention. These include changes in the support rod 72 of FIG. 1, and in the digit blanking assembly 102 and 104 of the same drawing.

Replacing tubular support rod 72 of FIG. 1 is a partial cylindrical supporting member 172. This lower supporting member is fixed and surrounded by the rotating light path assembly, unchanged from that of FIG. 1 and includes lower sleeve member 42, light paths 46 and 48, spaced and separated by members 50 and 51, as shown in the partial sectional view of FIG. 3. The use of supporting half cylinder 172 gives added strength to the stationary apparatus 70, when attached to the lower base plate 30. Various control pulses are obtained by appropriately spaced light slits as 200 in FIG. 3. The slit is placed at an elevation opposite the rotative light conductor path 48, so as to allow passage of light from bulb 74 into the said light path, at the instant the path is opposite slit 200. Slit 200 is an alternate to the use of deactivating pin 99.

Figure 3:
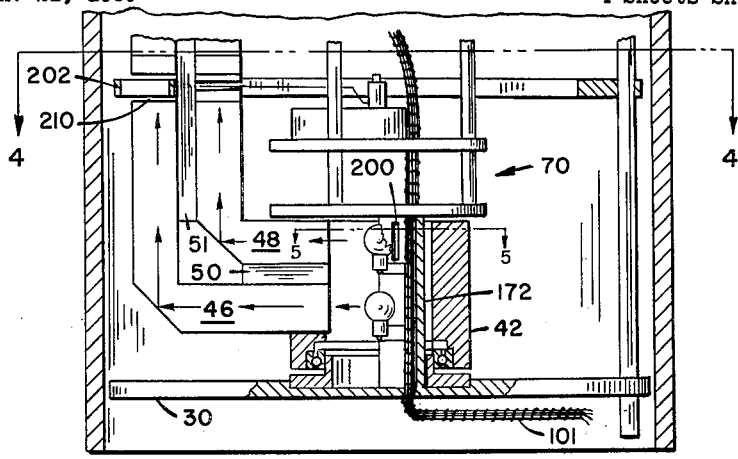
FIG. 3 represents a sectional elevation of apparatus having an additional feature according to this invention.
Figure 5:
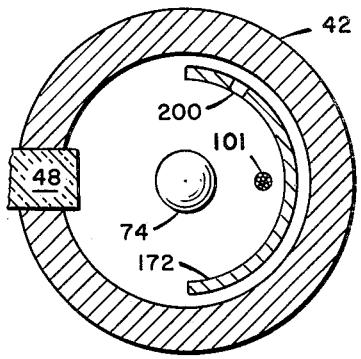
FIG. 5 is a cross sectional view taken along the line 5—5 of FIG. 3.
Figure 4:
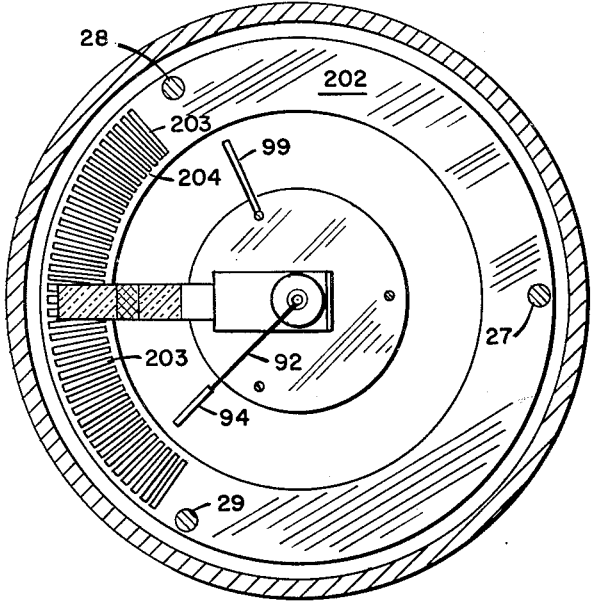
FIG. 4 is a cross-sectional view taken along the line 4—4 of FIG. 3.
Figure 6:
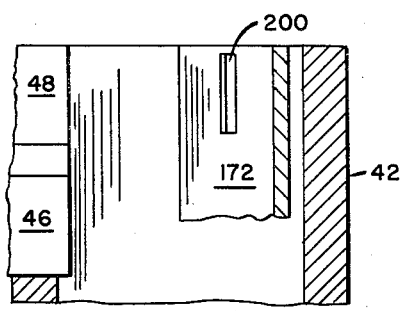
FIG. 6 is a cut-away elevational view showing the arrangement of the cylindrical support and light slot.

A further alternate embodiment includes an annular opaque digit blanking disk 202, having light admitters or slits 203. The disk-shaped member is appropriately spaced on longitudinal support rods 27, 28, and 29, at the elevation within rotative path of slot 210 to admit the light beam along path 46. Deactivating pin 99 is shown in FIG. 4, although its use in FIGS. 3 and 5 is precluded by support 172 and slit 200 to provide the control pulse.

Figure 10:
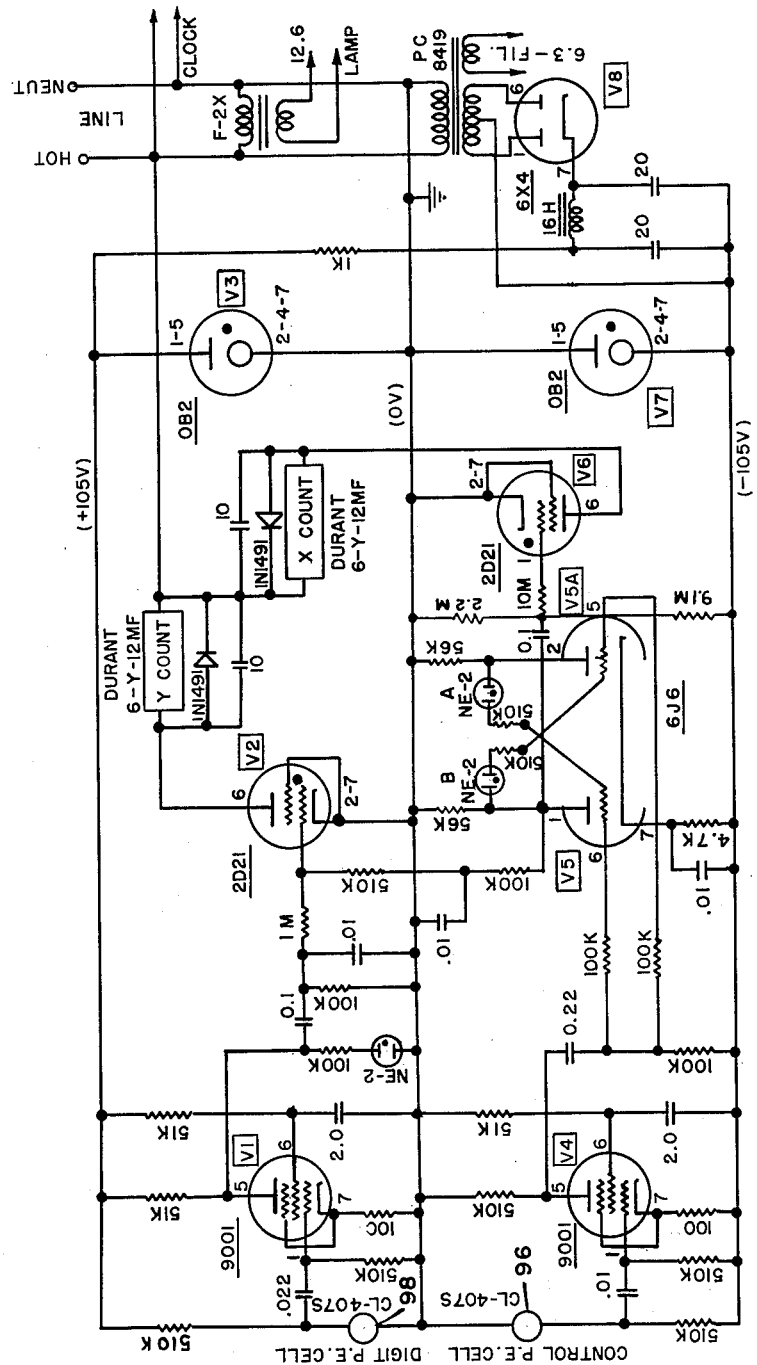
FIG. 10 is a representative electronic circuit diagram to be used with the apparatus of this invention.

FIG. 10 is a representative circuit diagram for use in this invention. Basically, tubes V–1 and V–4 and the associated circuit elements function as amplifiers of the output pulses of photocells 98 and 96 respectively. V–5 and V–5A, plus the associated circuit elements form a bi-stable multivibrator or "flip-flop" circuit which shifts the bias of tube V–2 alternately back and forth past cutoff. Tube V–6 acts as a switch to activate the X-counter at the start or completion of one cycle. V–3 and V–7 are voltage regulators while V–8 is a power supply rectifier.

*Operation*

Figure 8:
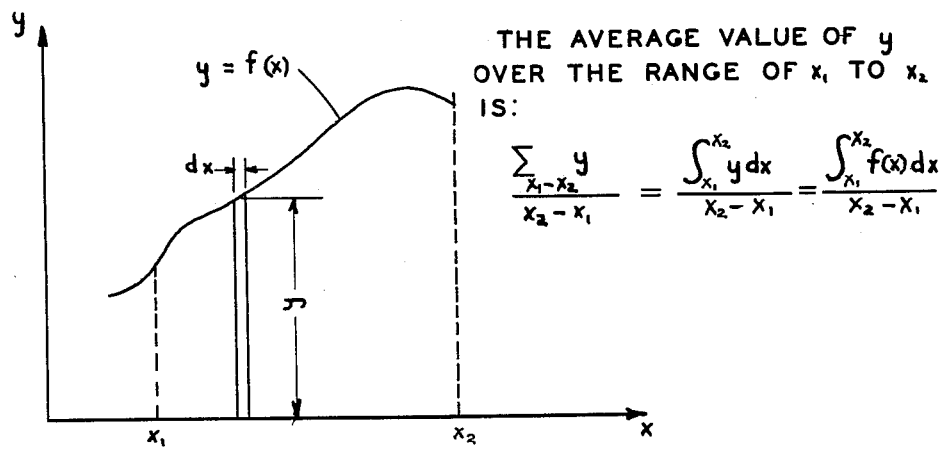
FIG. 8 is a graphic representation of a typical relation between two variables.

Typically, in the use of this apparatus, it will be desired to know the average value of one variable with respect to another variable over a given range. A common mathematical relation between the two variables is shown graphically in FIG. 8. The value of the variable $(y)$ is equal to some function of the variable $(x)$ or, $y = f(x)$. The total value (area under the curve) is the integral of $(y)dx$ over the interval of $x_1$ to $x_2$. The average value of the variable $(y)$, as the variable $(x)$ moves through the interval $(x_1)$ to $(x_2)$ is mathematically shown in FIG. 8. When this function of $(x)$ with respect to $(y)$ is known, the integral may be readily computed. However, when the relation between the variables is a strictly arbitrary or empirical, this integration cannot be performed until after the data are collected.

This invention allows integration to be obtained continuously as the variables assume their respective values.

In principle, the input variable $(y)$ is scanned at a rate proportional to the input variable $(x)$. Two separate sets of pulses are derived, one set a function of the input variable $(y)$, and the other set, a function of the input variable (x). One counting circuit sums the pulses produced in proportion to the variable (y), thus providing the direct integral. A second counting circuit sums up the pulses produced in proportion to the variable (x), thus providing the limits of the integration. Therefore, at any time, the (y) counter displays the integral reading, and its division by the (x) counter reading provides the average reading.

Figure 2:
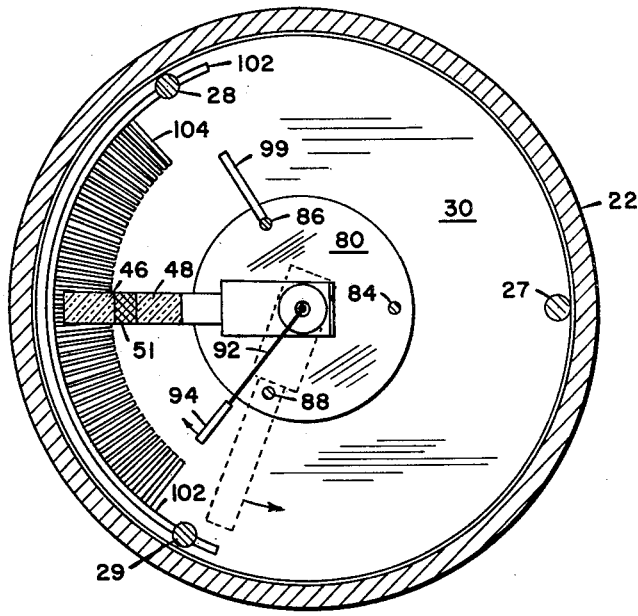
FIG. 2 is a cross-sectional view taken along the line 2—2 of FIG. 1.

In general, the mechanical analog to digital conversion system has been shown in FIGURES 1 through 7. For example, the device as described in FIGS. 1 and 2, operates as follows: Twin light paths 46 and 48 are caused to rotate by transducer 34, at a rate determined by the input variable (x). Assuming that rotation is in a counter-clockwise direction, the starting position is indicated by the dotted line of FIG. 2. The input variable (y) actuates angular displacement transducer 90, meter hand 92 and element 94. As shown in FIG. 2, the displacement is in a minimum position. Upon further counter-clockwise rotation of light paths 46 and 48, light path 48, upon passing interrupter 99, deactivates an appropriate electronic circuit connected with photoelectric cell 96, so that initial digits 104 are not recorded. As light path 48 passes interrupter 94 (transducer pointer), the count recording circuit is activated and all remaining digits are recorded. Broadly speaking, the (y) light path 48 is employed to control the number of admitted or interrupted light path pulses to be recorded.

Figure 9:
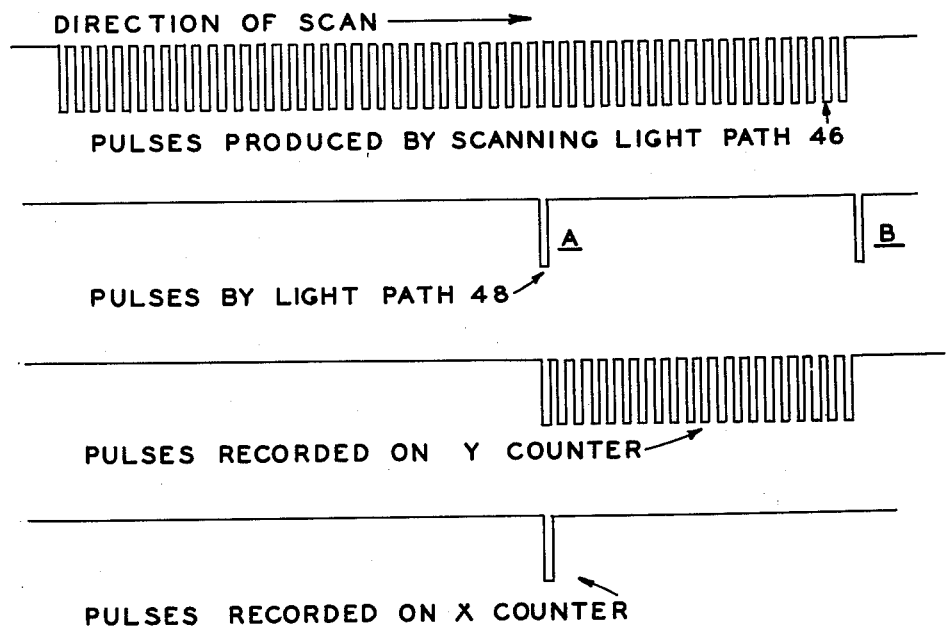
FIG. 9 is a diagrammatic representation of the pulses produced for a given problem when used in the apparatus of this invention.

In a typical example, a conventional timing motor was used at 34 to provide the input variable (x), thus making that variable equivalent to time. With the motor employed as such, the input variable (y) is scanned or measured every 15 seconds. The input variable (y) was introduced into the integration as varying direct current to the angular displacement transducer 90 (meter). The transducer range was from 0 to 25 microamperes. Since the range of the input variable is 25 microamperes, fifty blanking digit members 104, or admitters 203, were provided so that the meter could be read to the nearest one-half microampere. FIG. 9 shows the representative output of the converter for a (y) input signal of 10 microamperes. In other words, the meter movement 90 would assume a position to begin the scanning operation proportional to the (y) input to scan twenty (20) digit blanking members, or admitters 203. The photo-electric signals are transferred to a suitable readout device. Continued passage of light path 48, past interrupter pin 99, will deactivate the circuit to begin a new cycle.

A typical circuit diagram of the electronic section is shown in FIG. 10. With particular reference to FIGS. 9 and 10, the sequence of operation is as follows: At the beginning of the scan, tube V-5 is conducting, thereby biasing tube V-2, well below cut-off. As a result, the scanning light path 46 passes the digit blanking pins, or admitters 203, without recording the resulting pulses. When the rotating light paths each the point where the control light path 48 is interrupted by the meter pointer 92, the resulting pulse causes tube V-5A to conduct and tube V-5 to cut-off. This reduces the bias on tube V-2 so that the remaining pulses are recorded on the (y) counter. The pulse, initiated by the pointer 92, causes tube V-6 to conduct momentarily, thereby adding one count to the (x) counter.

Upon completion of the scan, the control light path 48 is again interrupted by pin 99. The resulting pulse causes tube V-5 to conduct and tube V-5A to shut off, again biasing tube V-2 well below cut off to deactivate the (y) counting circuit.

Each scan adds the number of digits to (y) counter, as determined by the position of the meter pointer (y input) and adds one digit to the (x) counter. The (y) counter is indicative of the integral. In the arrangement of the circuitry, shown in FIG. 10, neon lamps A and B were used, instead of conventional capacitor-type coupling in the control "flip-flop" to eliminate false counting, due to interaction between the (x) and (y) counting circuits. The integrator is not limited to any particular application, a few of which are mentioned.

In the production of crude oil, Lease Automatic Custody Transfer apparatus is now being employed to automatically meter and deliver oil to the pipeline. Various dielectric-type monitors are employed to detect and/or control the percentage of basic sediment and water (B.S. & W.) in the crude oil entering the pipeline. The apparatus of this invention can be connected to an instrument of this type to provide a weekly or monthly production run average of the percentage of B.S. & W. delivered to the pipeline.

In various chemical processes, it may be desirable to know the average temperature or pressure. In such an instance, the angular displacement transducer 90 will be a dial-type thermometer, or a pressure gauge. The other input variable is converted to the angular rotation of the light paths.

Other common types of variable functions in which it is desirable to know the integral or average value, are the measurement of electrical resistance, voltage, current, or power over some given interval are inclusive of this invention.

Other applications include the determination of average or total rainfall, river or lake levels, barometric pressure, temperature, snow load, etc., over a given interval.

As presently understood, the apparatus of this invention may be employed whenever the variables are of such a nature that they may be converted to a rate of rotation and an angular displacement.

Although the apparatus of this invention has been described in relation to particular apparatus and structure, it is within the purview of this invention that various alternate embodiments may be used and still fall within the definite apparatus described and claimed herein. For example, in some applications, information from more than one input variable is capable of integration in the unitary apparatus of this invention. Preferably, the information is transferred to angularly spaced angular displacement type transducers spaced on stationary assembly 70. Additional digit blanking pins or admitters may be spaced around the periphery of the housing correspondingly. The metering arm of each corresponding transducer is positioned within the rotative path of scanning beam 48.

I claim:

1. Apparatus for converting analog information into digital information, comprising a support housing, first and second light paths for conducting light from a fixed source at one end of the path to fixed first and second light sensitive pickups at the other end of the path, the pickups spaced opposite the first and second light paths respectively, the light path rotatably mounted so as to rotate about the light source and pickups, an interrupter disk fixed to the housing and spaced within the rotating first path, at least one set of interrupter spaces angularly disposed along the disk according to the maxima and minima limits of each corresponding angular displacement transducer, an indicator on each transducer moveable within the maxima and minima limits of the rotating second path to interrupt the light to the second pickup, according to a first input analog function, and means for rotating the path at a rate responsive to a second analog function, and means for converting the interrupted pulses to the first and second light sensitive pickups into digital information.

2. An integrator for linear and non-linear functions comprising a support, a light conductor path rotatably mounted on the support, a light source at one end of the path, first and second light-sensitive pickups at the other end of the path, a multiplicity of interrupters fixed to the support and spaced to alternately interrupt the path to the first pickup proportionately to a first function, a movable interrupter of the light path to the second pickup, the interrupter movable to various positions according to the first function, means for rotating the path at a rate responsive to a second function, means for energizing the light source, circuit means associated with the first pickup for responsively indicating the alternate interruptions, means for energizing the circuit after interruption of the light to the second pickup, means for indicating the number of revolutions of the path, and means for deenergizing the circuit after each revolution of the path.

3. An integrator for linear and non-linear functions comprising a support, a light source and conductor path rotatably mounted on the support about a first and second light sensitive pickup fixed to the support at the end of the path opposite the light source, a multiplicity of interrupters fixed to the support and spaced to alternately interrupt the light path to the first pickup, the alternate interruptions being proportionately to a first function, means on the support for movably positioning an interrupter in the conductor path to the second pickup according to the first function, means for rotating the path at a rate responsive to a second function, circuit means associated with the first pickup for responsively indicating the alternate interruptions, means for energizing the circuit after interruption of the light path to the second pickup, means for indicating the number of revolutions of the path, and means for deenergizing the circuit after each revolution of the path.

4. An integrator for linear and non-linear functions comprising a support, a light conductor path rotatably mounted on the support, a light source fixed to the support opposite one end of the conductor path, first and second light sensitive pickups fixed to the path at the other end, a multiplicity of interrupters fixed to the support and spaced to alternately interrupt the light path to the first pickup proportionately to a first function, an interrupter of the light path to the second pickup movable to various positions in the rotating path according to the first function, means for rotating the path at a rate responsive to a second function, means for energizing the light source and pickups, circuit means associated with the first pickup for responsively indicating the alternate light interruption, means for energizing the circuit after interruption of the light path to the second pickup, means for indicating the number of revolutions of the path, and means for deenergizing the circuit after each revolution of the path.

5. An integrator for linear and non-linear functions comprising a support, a light conductor path rotatably mounted on the support about a light source fixed to the support opposite one end of the path and first and second light sensitive pickups fixed to the support at the other end of the path, a multiplicity of interrupters fixed to the support and spaced within the rotative path to alternately interrupt the light path to the first pickup proportionately to a first function, an interrupter of the light path to the second pickup and movable to various positions, means for rotating the path at a rate responsive to a second function, means for energizing the light source and pickups, circuit means associated with the first pickup for responsively indicating the alternate light interruptions, means for energizing the circuit after interruption of the conductor path to the second pickup, means for indicating the number of revolutions of the path, and means for deenergizing the circuit after each revolution of the path.

References Cited in the file of this patent

UNITED STATES PATENTS

| | | |
|---|---|---|
| 2,605,963 | Bohn | Aug. 5, 1952 |
| 2,725,487 | Butler et al. | Nov. 29, 1955 |
| 2,913,180 | Rusk | Nov. 17, 1959 |